Patented Mar. 2, 1948

2,437,051

UNITED STATES PATENT OFFICE 2,437,051

HYDROGENATION OF CARBON MONOXIDE

Eugene E. Sensel, Beacon, and Roland A. Beck, Glenham, N. Y., assignors, by mesne assignments, to The Texas Company, New York, N. Y., a corporation of Delaware No Drawing. Application March 24, 1944, Serial No. 528,004

2 Claims. (Cl. 260—449.6)

This invention relates to the catalytic reaction between carbon monoxide and hydrogen to form liquid hydrocarbons, and is particularly concerned with improvements in the reaction based on changes in the composition of the catalysts employed in this reaction.

It is known that the reaction between carbon monoxide and hydrogen is extremely sensitive to variations in temperature, and that when utilizing any of the familiar catalysts for this reaction, it is important to maintain the reaction temperature within selected narrow limits in order to obtain the desired products. For example, when using a selected catalyst under given conditions of charge, space velocity, etc., there will be a narrow range of temperatures at which a maximum amount of liquid hydrocarbons is produced. At higher temperatures, with all other conditions remaining constant, the yield of liquid hydrocarbons will be lower, and there will be a corresponding increase in the amount of gaseous conversion products. On the other hand, at lower temperatures, the percentage conversion is materially reduced.

Catalysts have been disclosed for use in this reaction comprising metallic cobalt, together with a promoter such as one or more of the oxides of thorium, magnesium, uranium, manganese and vanadium on a suitable supporting material, particularly a silicious material, such as diatomaceous earth, silica gel, and various clays. The catalysts may be prepared by preparing an aqueous solution of a mixture of suitable compounds such as the nitrates, acetates and formates of the metals to be employed as such or as the oxides, mixing the support with the solution, and then precipitating the metals as the carbonates by adding a suitable alkali metal carbonate. After drying, the catalyst, if it is to be used in a fixed bed reaction, is formed into pellets or granules in any suitable manner. Thereafter, prior to use in the reaction, the catalyst is reduced in a stream of hydrogen or hydrogen-containing gases to convert the catalytic metal largely to the free state.

It is an object of the invention to provide a catalytic method for the hydrogenation of carbon monoxide to form liquid products of desirable properties with respect to unsaturation.

A more specific object of the invention is to provide a catalytic method for the hydrogenation of carbon monoxide utilizing a cobalt catalyst at relatively high reaction temperatures and yielding a high percentage of liquid products.

Other objects of the invention will in part be obvious and will in part appear hereinafter.

We have discovered in accordance with the invention that it is possible to carry out the reaction between carbon monoxide and hydrogen in the presence of a cobalt catalyst at relatively elevated temperatures, and obtain excellent yields of relatively unsaturated hydrocarbons by utilizing such a catalyst having incorporated therein varying amounts of an alkali metal compound within the range of amounts equivalent to about 0.55 per cent to 2.85 per cent of the corresponding alkali metal, based on the weight of the cobalt in the catalyst. The alkali metal compound preferably is alkaline in reaction and if it is a salt it contains an acid radical which is innocuous with respect to the activity of the catalyst. As examples of the types of compounds that are included within the scope of the invention, there may be mentioned the alkali metal, particularly sodium, carbonates, bicarbonates, hydroxides, formates, acetates, citrates, and the like. Since the carbonates are readily available and have been found to produce excellent results, it is preferred to use these compounds.

The incorporation of an alkali metal compound in the catalyst accomplishes at least two results. First, it alters the properties of the catalyst in the direction of maximum activity at higher temperatures and this alteration is roughly proportional to the amount of alkali metal compound present, within the limits specified. Secondly, the use of the catalyst containing the alkali metal compound results in the production of liquid hydrocarbons which are more unsaturated, an obvious advantage when the hydrocarbons are to be used as motor fuel. Thus, it has been found that by incorporating an alkali metal compound in a catalyst in an amount within the range specified, about the same yield of liquid products will be obtained as in an operation using a similar catalyst in which such a compound has not been incorporated, but that this yield is obtained at a higher temperature and the liquid products are more unsaturated.

Inasmuch as sodium carbonate is a satisfactory compound for use in accordance with the invention, further description will be given of operations utilizing this compound. The sodium carbonate may be incorporated in the catalysts in various ways. For example, when sodium carbonate is employed in solution to precipitate the metallic nitrates as carbonates, it is possible to use an excess of this compound and then to control the washing of the precipitate so as to retain in the catalyst the desired amount of alkali metal compound. This, however, is difficult to do, and it is preferred to wash the catalyst substantially free of alkali metal and then to add the sodium carbonate. It will be understood that when proceeding in the latter way, it is often impossible to eliminate the last traces of alkali metal from the catalyst. Our experience indicates that when the catalyst is washed thoroughly to remove alkali metal and other soluble impurities any traces of alkali metal that may remain may be disregarded.

Reactions involving the use of the catalysts containing the alkali metal compound are carried out in the same manner as reactions involving the use of other catalysts for the hydrogenation of carbon monoxide, except, as pointed out above, the temperatures maintained will be higher. As is true with respect to any catalyst for this reaction, the optimum reaction temperature should be determined prior to continuing the reaction for an extended period of time by making short tests at various temperatures. In general, the catalysts of the invention produce optimum results at temperatures varying from about 360° to about 460° F.; i. e., the optimum narrow temperature range for a given catalyst will generally fall within this range. The pressure at which the reaction is carried out may be varied since atmospheric or higher pressures may be used.

In order that the invention may be understood more fully reference should be had to the following example and table. A cobalt catalyst was prepared as follows:

1975 grams of cobalt nitrate, CO(NO₃)₂.6H₂O, 26.1 grams of thorium nitrate, Th(NO₃)₄.4H₂O, and 867 grams of Filter-Cel (a diatomaceous earth) are mixed with sufficient water to make up five liters of aqueous mixture. Thereafter, 375 cc. of a magnesium nitrate solution prepared by dissolving 222 grams of magnesium oxide in 750 cc. of nitric acid plus sufficient water to make a volume of two liters were added to the mixture. After stirring for one-half hour, the metals were precipitated in the form of the carbonates by the slow addition of a ten per cent sodium carbonate solution in an amount sufficient to effect complete precipitation. The resulting mixture of precipitates and support was filtered and washed ten times with five liters of water each time. This procedure was repeated four times and the batches were combined and then divided into equal portions.

A. One portion was dried to a water content of about 20 per cent, ground to 40 mesh and pelleted in a conventional pelleting machine having $\tfrac{3}{32}$ inch dies. This catalyst will be referred to as catalyst A.

B. A portion of the batch of catalyst prepared as described above, amounting to 2894 grams and containing 77 per cent by weight water, was mixed with 500 cc. of water containing 0.513 gram of sodium carbonate. The resulting mixture was dried and pelleted as described in paragraph A. The catalyst will be referred to as catalyst B.

C. Another portion of the batch was treated in the same manner as described in paragraph B, except that the sodium carbonate solution contained 2.56 grams of sodium carbonate. The catalyst will be referred to as catalyst C.

D. Another portion of the batch was treated in the same manner as described in paragraph B, except that the sodium carbonate solution contained 5.13 grams of sodium carbonate. The catalyst will be referred to as catalyst D.

E. Another portion of the batch was treated in the same manner as described in paragraph B, except that the sodium carbonate solution contained 10.3 grams of sodium carbonate. The catalyst will be referred to as catalyst E.

F. Another portion of the batch was treated in the same manner as described in paragraph B, except that the sodium carbonate solution contained 15.4 grams of sodium carbonate. The catalyst will be referred to as catalyst F.

Each of the catalysts prepared as above described was reduced in a stream of hydrogen at a temperature of about 752 to 806° F., and a space velocity of about 23 (23 volumes of hydrogen per hour per volume of catalyst) for 24 hours. The catalysts were then conditioned by passing the synthesis gas consisting of a mixture of carbon monoxide and hydrogen in a 1:2 molecular proportion for six hours, starting at a temperature of about 300° F. and concluding at the temperature at which the reaction was to be carried out.

Based on the weight of the catalysts in condition for use, it is pointed out that the following quantities of sodium carbonate were added to the catalysts: catalyst A, 0.00%; catalyst B, 0.09%; catalyst C, 0.43%; catalyst D, 0.86%; catalyst E, 1.71%; and catalyst F, 2.57%. Since the catalyst contained about 32% by weight cobalt, this corresponds to the following percentages of sodium based on the weight of the cobalt: catalyst A, 0.00%; catalyst B, 0.12%; catalyst C, 0.58%; catalyst D, 1.17%; catalyst E, 2.32%; and catalyst F, 3.48%.

The reduced and conditioned catalysts were used as catalysts in reactions as described in the following table. The reactions were carried out by passing a charge or synthesis gas, consisting of a mixture of carbon monoxide and hydrogen in the proportions of one mol of carbon monoxide to two mols of hydrogen, at a space velocity of 100 (100 volumes of charge gas per hour per volume of catalyst) in contact with the catalyst at the indicated temperature and at atmospheric pressure. The products were collected and analyzed and the results are set out in the following table:

| Reaction Temperature, °F. | Weight per cent of synthesis gas converted to— | | | | | Bromine Number of Liquid Hydrocarbons |
|---|---|---|---|---|---|---|
| | Hydrocarbons | | | $H_2O$ | $CO_2$ | |
| | Liquid | Gaseous | | | | |
| | | $CH_4$, $+C_2$'s | $>C_2$'s | | | |
| CATALYST A | | | | | | |
| 374 | 14.9 | 9.8 | 24.3 | 29.4 | 1.4 | 14 |
| 392 | 19.0 | 20.5 | 23.6 | 39.0 | 3.3 | 19 |
| 410 | 17.1 | 21.7 | 24.2 | 39.8 | 4.8 | 26 |
| CATALYST B | | | | | | |
| 374 | 15.0 | 12.0 | 20.9 | 26.9 | 1.8 | 14 |
| 392 | 17.6 | 19.7 | 16.6 | 36.1 | 2.6 | 18 |
| 410 | 16.5 | 26.0 | 26.4 | 40.0 | 4.8 | 30 |
| CATALYST C | | | | | | |
| 374 | 13.5 | 5.2 | 14.5 | 28.7 | 1.8 | 16 |
| 392 | 17.6 | 16.9 | 18.6 | 37.4 | 3.8 | 19 |
| 410 | 18.9 | 25.2 | | 41.4 | 6.8 | 25 |
| 428 | 15.0 | 35.0 | 28.0 | 40.2 | 12.9 | 32 |

CATALYST D

| | | | | | | |
|---|---|---|---|---|---|---|
| 374 | 3.7 | 9.0 | 12.3 | 15.8 | 1.2 | 14 |
| 392 | 10.8 | 11.8 | 31.2 | 25.3 | 2.3 | 28 |
| 410 | 17.6 | 13.3 | 13.1 | 35.3 | 5.2 | 32 |
| 428 | 18.9 | 22.1 | 15.5 | 38.0 | 9.5 | 38 |

CATALYST E

| | | | | | | |
|---|---|---|---|---|---|---|
| 374 | 2.3 | 43.7 | 9.3 | 6.8 | 0.8 | 12 |
| 392 | 7.2 | 25.3 | 24.4 | 16.0 | 1.6 | 26 |
| 410 | 12.9 | | 19.9 | 25.2 | 2.7 | 38 |
| 428 | 19.8 | 12.5 | 12.7 | 35.2 | 10.8 | 40 |
| 446 | 19.0 | 23.0 | 17.1 | 34.5 | 23.5 | 36 |
| 464 | 14.0 | 35.3 | 25.1 | 37.1 | 22.6 | 40 |

CATALYST F

| | | | | | | |
|---|---|---|---|---|---|---|
| 374 | 0.8 | 14.9 | 13.6 | 4.4 | 0.8 | |
| 392 | 1.6 | 22.9 | 19.0 | 7.9 | 1.2 | |
| 410 | 3.8 | | | 14.4 | 2.9 | 50 |
| 428 | 7.7 | 15.5 | 39.7 | 22.6 | 5.9 | 39 |
| 446 | 9.0 | 21.4 | 28.2 | 26.3 | 11.9 | 51 |
| 464 | 12.7 | 23.7 | 17.5 | 28.2 | 38.5 | 44 |
| 482 | 9.8 | 23.5 | 15.0 | 32.8 | 30.9 | 53 |

From the data recorded in the table it will be seen that, whereas the addition of a very small amount of sodium carbonate to the catalyst has an unimportant effect upon its properties, the addition of an amount within the range specified above so changes the catalyst that its maximum activity is at a higher temperature. Also, it will be seen that the addition of progressively larger amounts of sodium carbonate tends to raise the optimum reaction temperature, but that when an amount greater than the amounts within the range is added, the yields of liquid hydrocarbons are reduced at all temperatures.

It will be understood that these examples are illustrative of the application of the invention and the invention includes other similar methods using this catalyst and similar cobalt catalysts with other alkali metal compounds, such as potassium, lithium, and rubidium compounds, especially the carbonates.

The method may be varied within wide limits, including the proportions of carbon monoxide and hydrogen, reaction pressure, space velocity, etc., since the effect of the addition of the alkali metal compound apparently is independent of variables other than temperature.

Obviously many modifications and variations of the invention as hereinbefore set forth, may be made without departing from the spirit and scope thereof, and therefore only such limitations should be imposed as are indicated in the appended claims.

We claim:

1. In the process for reacting carbon monoxide and hydrogen at elevated temperatures by contact with a catalyst, the method of increasing the yield of relatively unsaturated liquid hydrocarbons which comprises contacting a mixture of carbon monoxide and hydrogen at a temperature within the range of from about 392° F. to about 450° F. with a solid catalyst consisting of a major proportion of metallic cobalt in admixture with thorium oxide, and with an amount of sodium carbonate within the range corresponding to from about 0.55 to about 2.85 per cent sodium by weight based on the weight of the cobalt, supported on a siliceous supporting material, and correlating said contact temperature with the sodium content of said catalyst, said temperature being higher within said range as the amount of sodium is increased, thereby obtaining a maximum production of unsaturated liquid hydrocarbons.

2. In the process for reacting carbon monoxide and hydrogen at elevated temperatures by contact with a catalyst, the method of increasing the yield of relatively unsaturated liquid hydrocarbons which comprises passing a mixture of carbon monoxide and hydrogen at a temperature of about 428° F. into contact with a solid catalyst consisting of a major proportion of metallic cobalt in admixture with thorium oxide and about 2.3 per cent sodium carbonate by weight based on the weight of the cobalt, supported on a siliceous supporting material.

EUGENE E. SENSEL.
ROLAND A. BECK.

REFERENCES CITED

The following references are of record in the file of this patent:

UNITED STATES PATENTS

| Number | Name | Date |
|---|---|---|
| 1,801,382 | Wietzel | Apr. 21, 1931 |
| 2,183,145 | Michael | Dec. 12, 1939 |
| 2,183,146 | Michael | Dec. 12, 1939 |
| 2,220,261 | Michael | Nov. 4, 1940 |
| 2,225,487 | Roelen | Dec. 17, 1940 |
| 2,254,806 | Michael | Sept. 2, 1941 |